J. W. BEER & A. W. BEER.
Improvement in Hubs and Axles.
No. 130,102.   Patented Aug. 6, 1872.
Fig. 1.
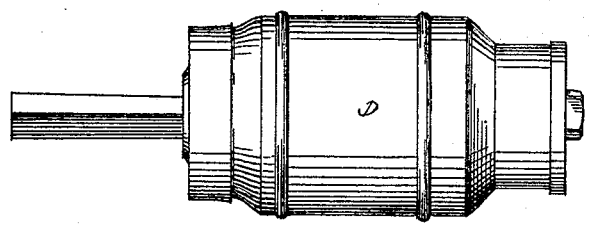
Fig. 2.
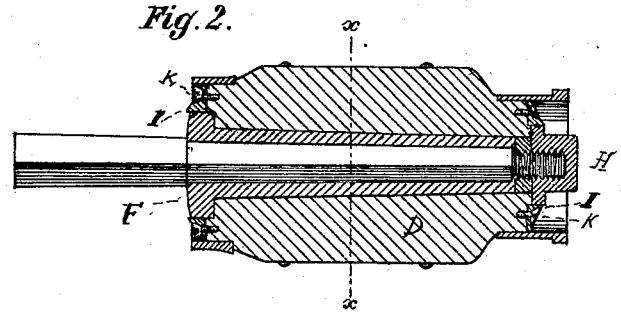
Fig. 3.   Fig. 4.
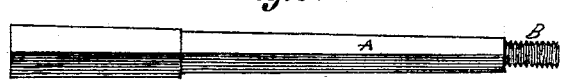   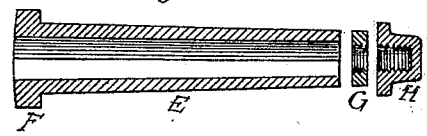
Fig. 5.
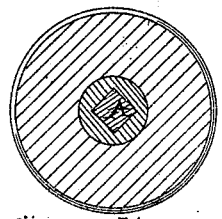
Section on Line x. x.
Witnesses:   Inventor:
Edward U. Farrell   J. W. & A. W. Beer
W. T. Henderson   By Daniel Breed
   Atty

UNITED STATES PATENT OFFICE.

JOSEPH W. BEER, OF MYERS' DALE, AND ABSALOM W. BEER, OF RURAL VALLEY, PENNSYLVANIA.

IMPROVEMENT IN HUBS AND AXLES.

Specification forming part of Letters Patent No. 130,102, dated August 6, 1872.

SPECIFICATION.

We, JOSEPH W. BEER, of Myers' Dale, Somerset county, Pennsylvania, and ABSALOM W. BEER, of Rural Valley, Armstrong county, Pennsylvania, have invented certain Improvements in Axles and Hubs, of which the following is a specification:

In the accompanying drawing, Figure 1 is a front view of the hub and axle. Fig. 2 is a longitudinal section of the same. Fig. 3 is a transverse section, and Figs. 4 and 5 are detached views.

Our invention consists, first, in a new arrangement of sleeve in combination with an axle or spindle; and, secondly, of plates or rings upon the ends of the hub, said plates having flanges extending inward against the boxing, and also forming the boxing for the collar on the inner end of the sleeve, and for the nut holding the wheel upon the axle.

In the construction of our improved axle the spindle A may be made square, as seen in Figs. 3 and 5, and provided with the ordinary screw B upon its end for receiving the nut H, which holds the wheel or hub D, Fig. 2. The sleeve E is made to fit this spindle, and has a collar, F, upon the inner end. This sleeve, being slipped upon the spindle, is then fastened in place by a small nut, G, which is tapered to correspond with the smaller end of the sleeve, and thus extend the bearing-surface of the hub-box. After the wheel is put on the axle the common nut H is screwed home to bear against the smaller nut G, which serves like the shoulder in the common axle. By this simple construction one male screw, B, serves to fasten both the sleeve and the wheel, and the usual expense of a screw upon the sleeve is saved. Our hub is made with a plate or ring, I, upon each end, as seen in Fig. 2. These plates are fastened by means of wood or gimlet screws K, and they have flanges, which rest against the hub-boxing, as seen in Fig. 2, and thus hold the hub-boxes in place. These plates or rings also form boxing for the collar on the inner or larger end of the sleeve, and for the nut H, which holds the wheel upon the axle, thus forming a close joint for keeping out sand or other matter which would produce friction.

The above-described arrangement of sleeve is cheap in construction and very durable; the plates upon the end of the wooden hub are also simple and a great improvement.

Having thus described our invention, we claim—

1. The above-described arrangement and combination of the sleeve E with the spindle A having screw B thereon, small nut G for holding the sleeve, and large or common nut H for holding the hub, both nuts being on the same screw, substantially in the manner and for the purpose set forth.

2. We also claim the annular plate or plates I upon the end or ends of the hub, for the purposes set forth.

JOSEPH W. BEER.
A. W. BEER.

Witnesses:
SAM. JONES,
JOHN B. WAMPLER.